United States Patent
Bowman et al.

(10) Patent No.: US 8,662,803 B2
(45) Date of Patent: Mar. 4, 2014

(54) WHEEL RESTRAINT SYSTEM

(76) Inventors: Donald Bowman, Lethbridge (CA);
Randall Bowman, Lethbridge (CA)

( * ) Notice: Subject to any disclaimer, the term of this patent is extended or adjusted under 35 U.S.C. 154(b) by 0 days.

(21) Appl. No.: 13/497,279

(22) PCT Filed: Nov. 10, 2010

(86) PCT No.: PCT/CA2010/001753
§ 371 (c)(1),
(2), (4) Date: Mar. 21, 2012

(87) PCT Pub. No.: WO2011/057389
PCT Pub. Date: May 19, 2011

(65) Prior Publication Data
US 2012/0219376 A1    Aug. 30, 2012

(30) Foreign Application Priority Data
Nov. 16, 2009    (CA) ..................... 2686022

(51) Int. Cl.
*B60P 3/075*    (2006.01)
(52) U.S. Cl.
USPC .............................................. 410/9
(58) Field of Classification Search
USPC ........... 410/9, 7, 19, 49, 30; 248/346.03, 500;
188/36
See application file for complete search history.

(56) References Cited

U.S. PATENT DOCUMENTS

| | | | |
|---|---|---|---|
| 4,216,724 A * | 8/1980 | Grillet | 104/258 |
| 4,227,633 A * | 10/1980 | Sellberg | 224/42.28 |
| 4,399,893 A | 8/1983 | Switzer | |
| 4,979,856 A * | 12/1990 | Blunden et al. | 410/9 |
| 5,137,121 A | 8/1992 | Leonard | |
| 5,173,018 A | 12/1992 | Kissel et al. | |
| 5,312,213 A * | 5/1994 | Winsor | 410/9 |
| 5,593,260 A | 1/1997 | Zimmerman | |
| 5,664,930 A | 9/1997 | Ellis | |
| 5,689,981 A | 11/1997 | DeLuca et al. | |
| 5,908,274 A | 6/1999 | Silberman | |
| 6,099,219 A | 8/2000 | Bartholomay | |
| 6,227,512 B1 | 5/2001 | Andre et al. | |
| 6,851,523 B1 * | 2/2005 | Gaster | 188/32 |
| 6,938,734 B2 | 9/2005 | Curl | |
| 7,004,696 B2 * | 2/2006 | Anderson et al. | 410/30 |
| 7,150,592 B2 | 12/2006 | Anderson et al. | |
| 7,264,092 B2 | 9/2007 | Jette | |
| 7,287,942 B1 | 10/2007 | Valkenburgh | |

(Continued)

FOREIGN PATENT DOCUMENTS

CA    1287520    8/1991
CA    2650090    1/2009

*Primary Examiner* — Glenn Dayoan
*Assistant Examiner* — Sunsurraye Westbrook
(74) *Attorney, Agent, or Firm* — Davis & Bujold, PLLC; Michael J. Bujold

(57) ABSTRACT

A wheel restraint system has a restraint body having a lower portion and an upper portion. The upper portion is connected to the lower portion by a pivot point. The upper portion has a clamping portion extending across at least a portion of an upper portion of an outer surface of the wheel to be restrained. The upper portion moves about the pivot point between a release position and a clamping position such that the clamping portion moves toward and away from the outer surface of the wheel to be restrained. An actuator moves the upper portion between the release position and the clamping position. An anchor anchors the lower portion to a surface.

10 Claims, 10 Drawing Sheets

(56) References Cited

U.S. PATENT DOCUMENTS

| | | |
|---|---|---|
| 7,959,389 B2 | 6/2011 | Fischer |
| 2004/0105733 A1* | 6/2004 | Hewitt .......................... 410/66 |
| 2005/0047887 A1 | 3/2005 | Kenny |

* cited by examiner

WHEEL RESTRAINT SYSTEM

This application is a National Stage completion of PCT/CA2010/001753 filed Nov. 10, 2010 which claims priority from Canadian patent application serial no. 2,686,022 filed Nov. 16, 2009.

FIELD

This relates to a wheel restraint system, such as a wheel restraint system that may be used to restrain wheeled vehicles during transport or storage.

BACKGROUND

The most common method of securing an ATV for transport are tie straps. However, these straps are somewhat awkward to attach and may become loose. Other systems exist that do not involve tie downs, such as the ATV MIGHTY TITE™ (qwikreleasetiedown.com), which engages the hitch of an ATV.

SUMMARY

There is provided a wheel restraint system, comprising a restraint body having a lower portion and an upper portion. The upper portion is connected to the lower portion by a pivot point. The upper portion has a clamping portion extending across at least a portion of an upper portion of an outer surface of the wheel to be restrained. The upper portion moves about the pivot point between a release position and a clamping position such that the clamping portion moves toward and away from the outer surface of the wheel to be restrained. An actuator moves the upper portion between the release position and the clamping position. An anchor anchors the lower portion to a surface.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
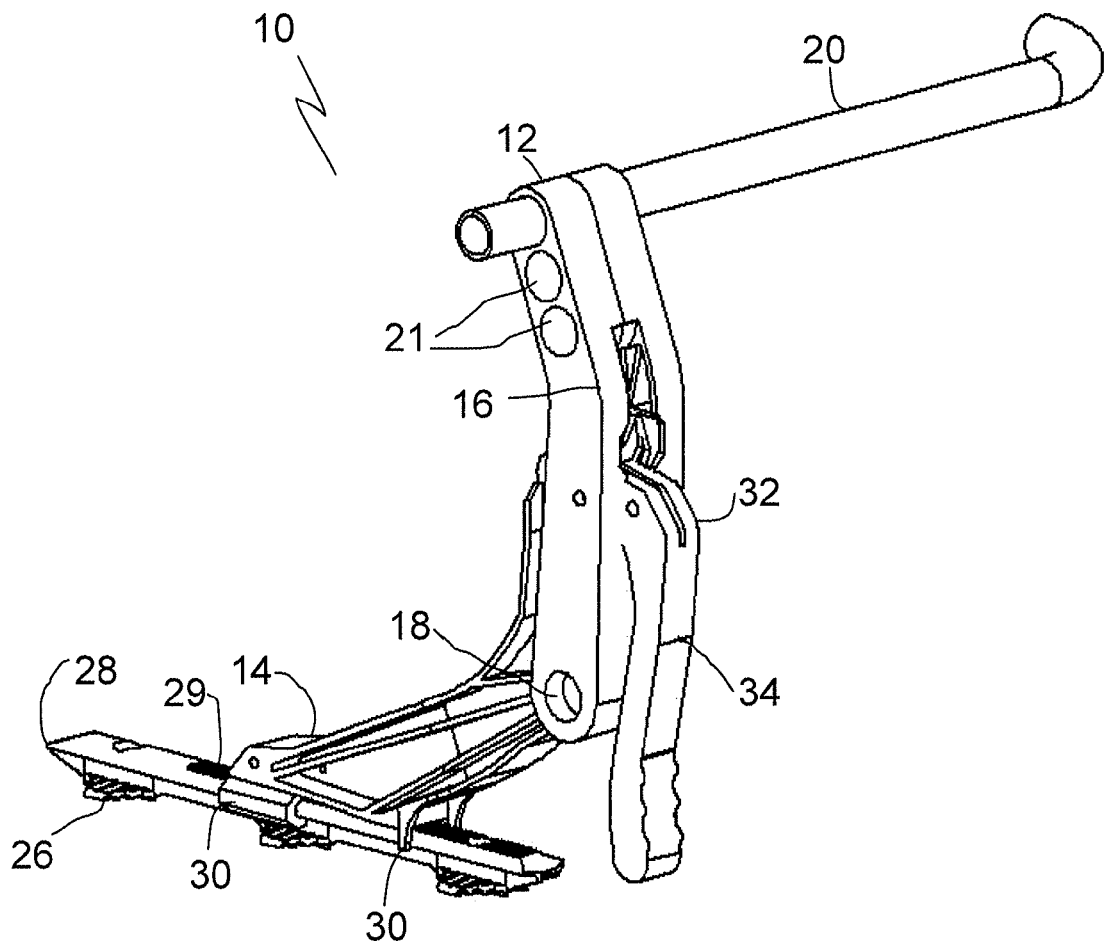
FIG. 1 is a rear perspective view of a wheel restraint system
Figure 2:
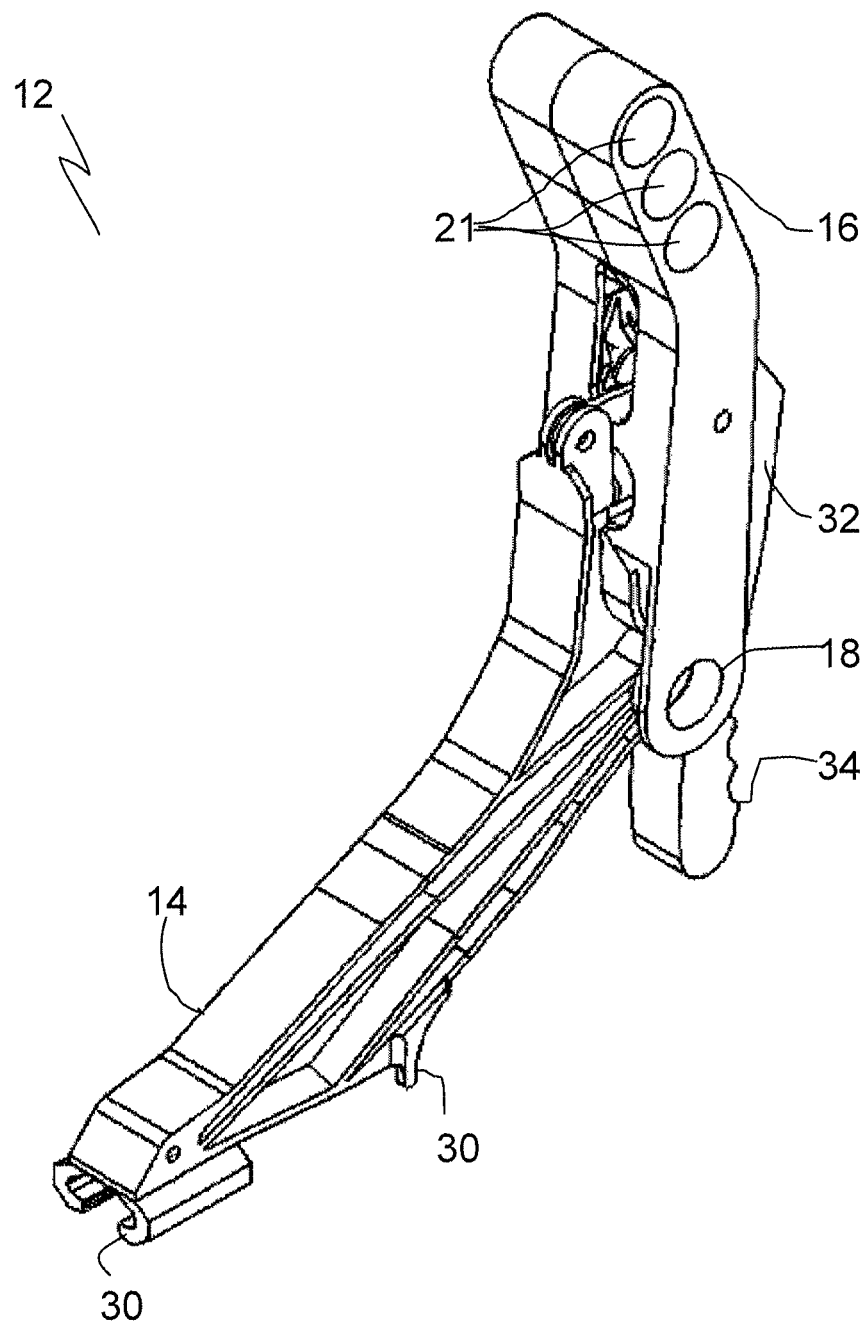
FIG. 2 is a front perspective view of the restraint body of the wheel restraint system.

A wheel restraint system generally identified by reference numeral 10 will now be described with reference to FIG. 1 through 12.

Figure 3:
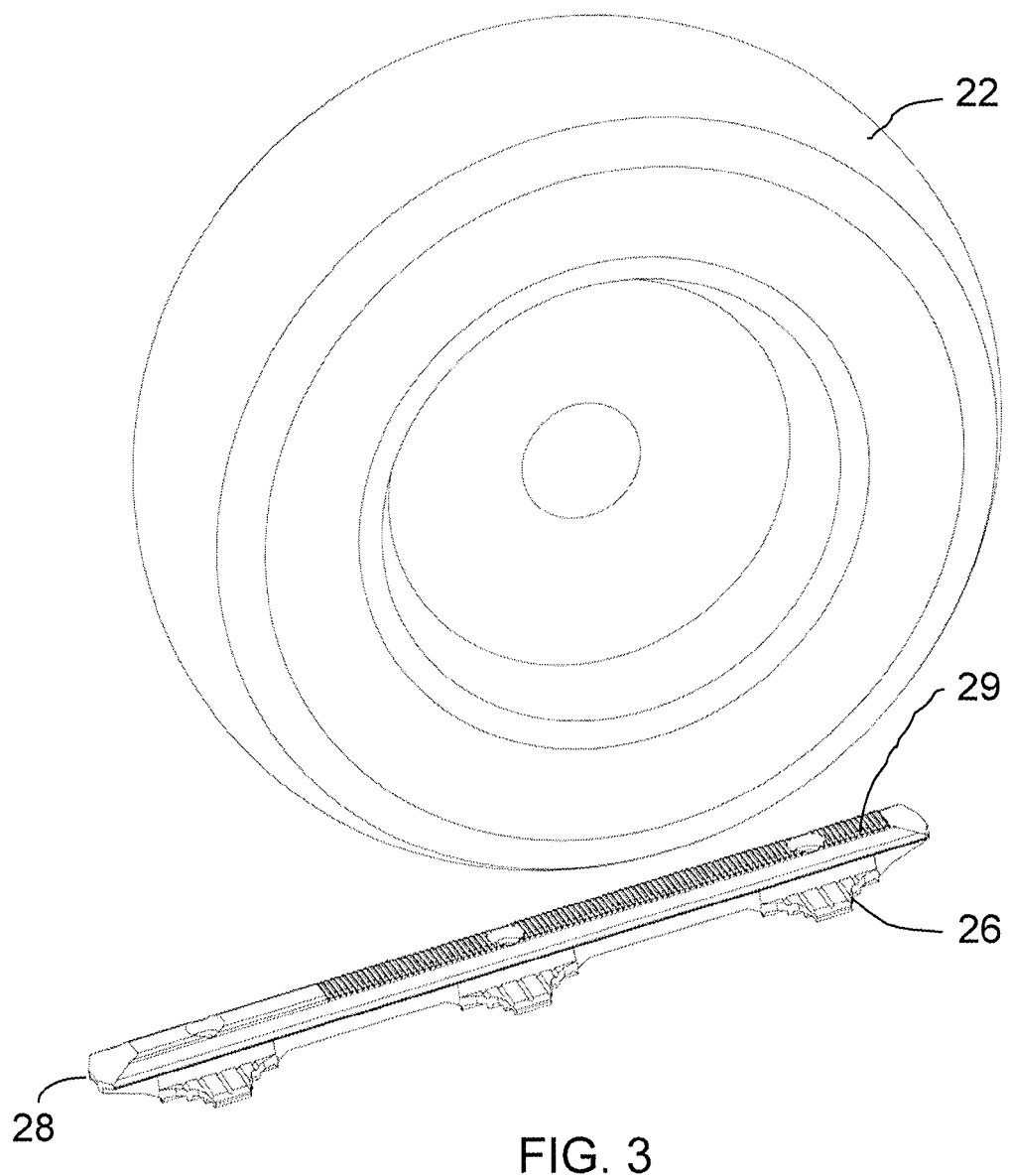
FIG. 3 is a perspective view of the anchor of the wheel restraint system.
Figure 4:
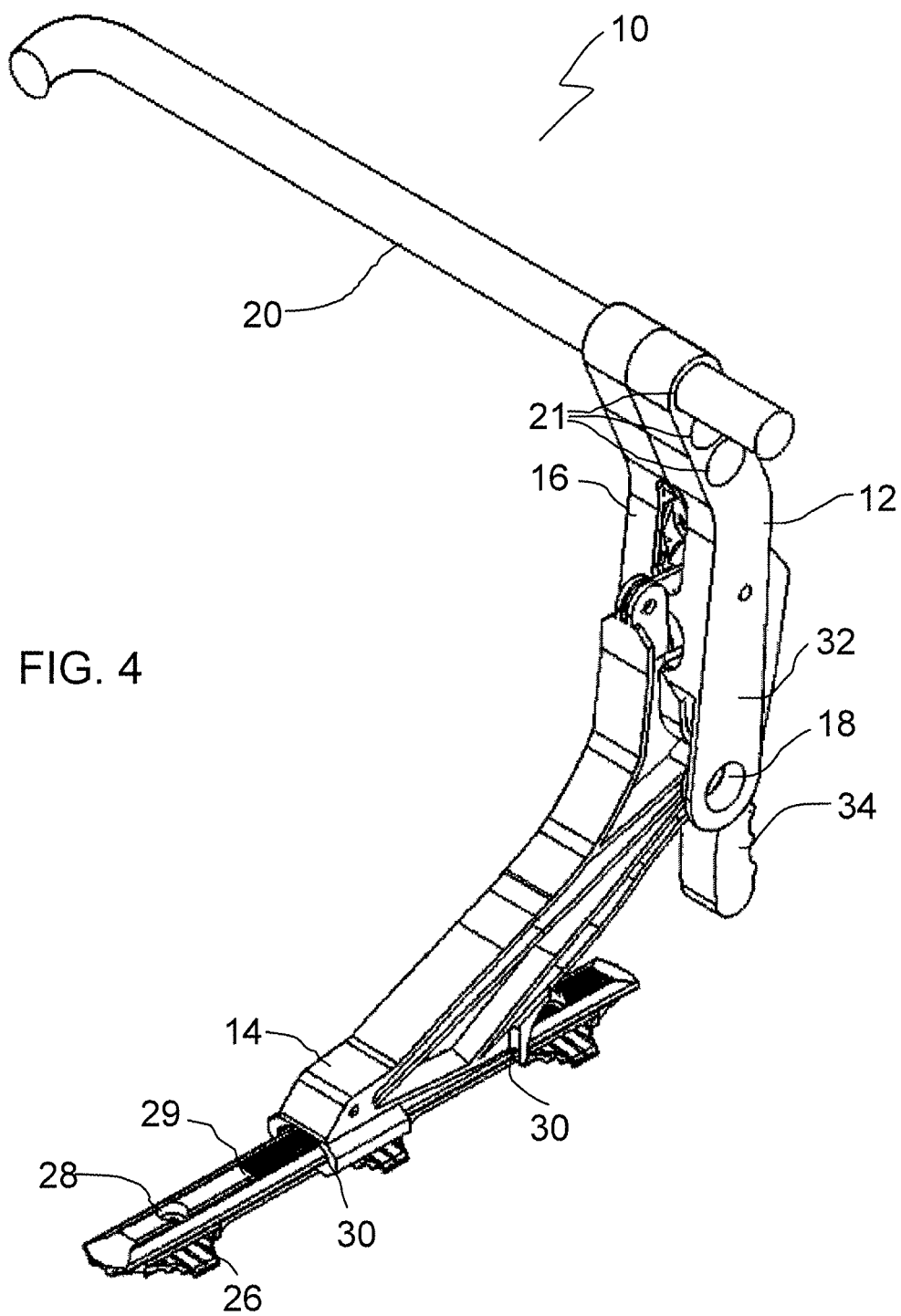
FIG. 4 is a front perspective view of the wheel restraint system illustrated in FIG. 1.
Figure 5:
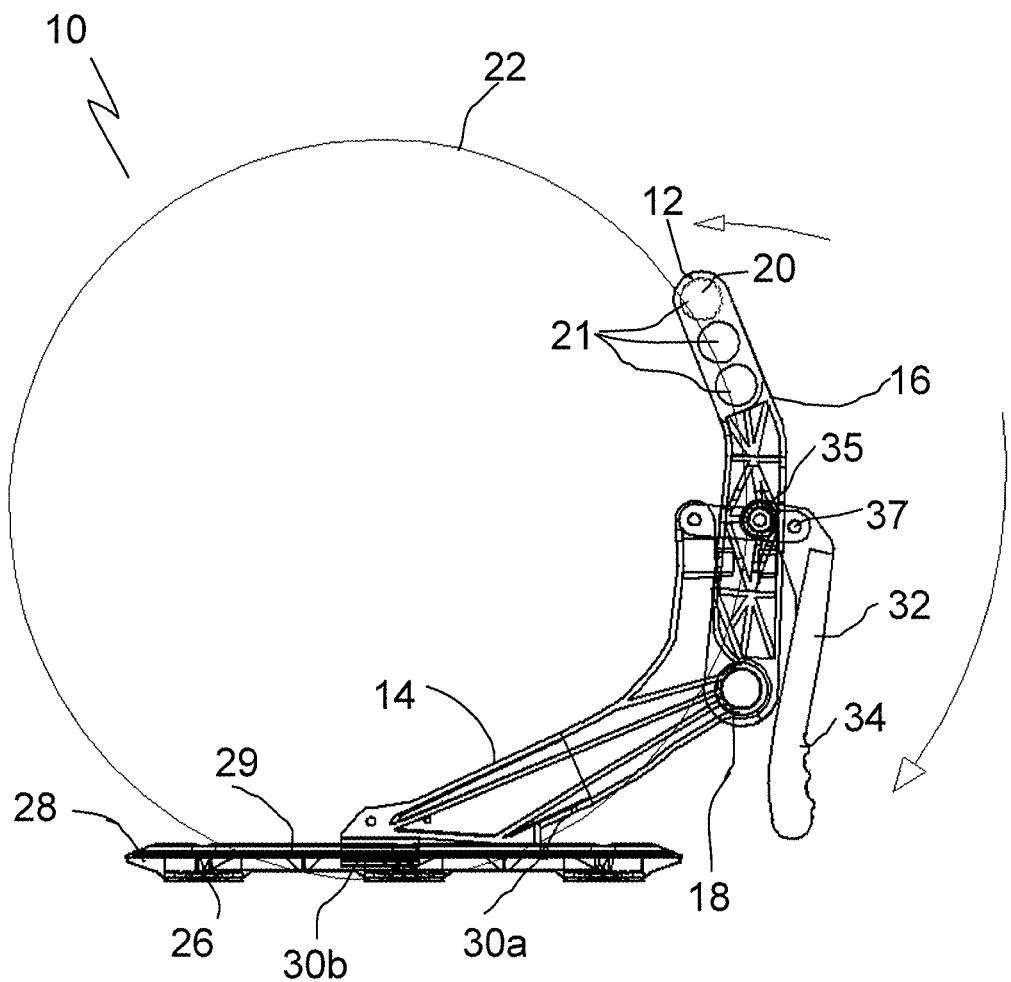
FIG. 5 is a side elevation view in partial section of the wheel restraint system with the upper portion in the clamping position.
Figure 6:
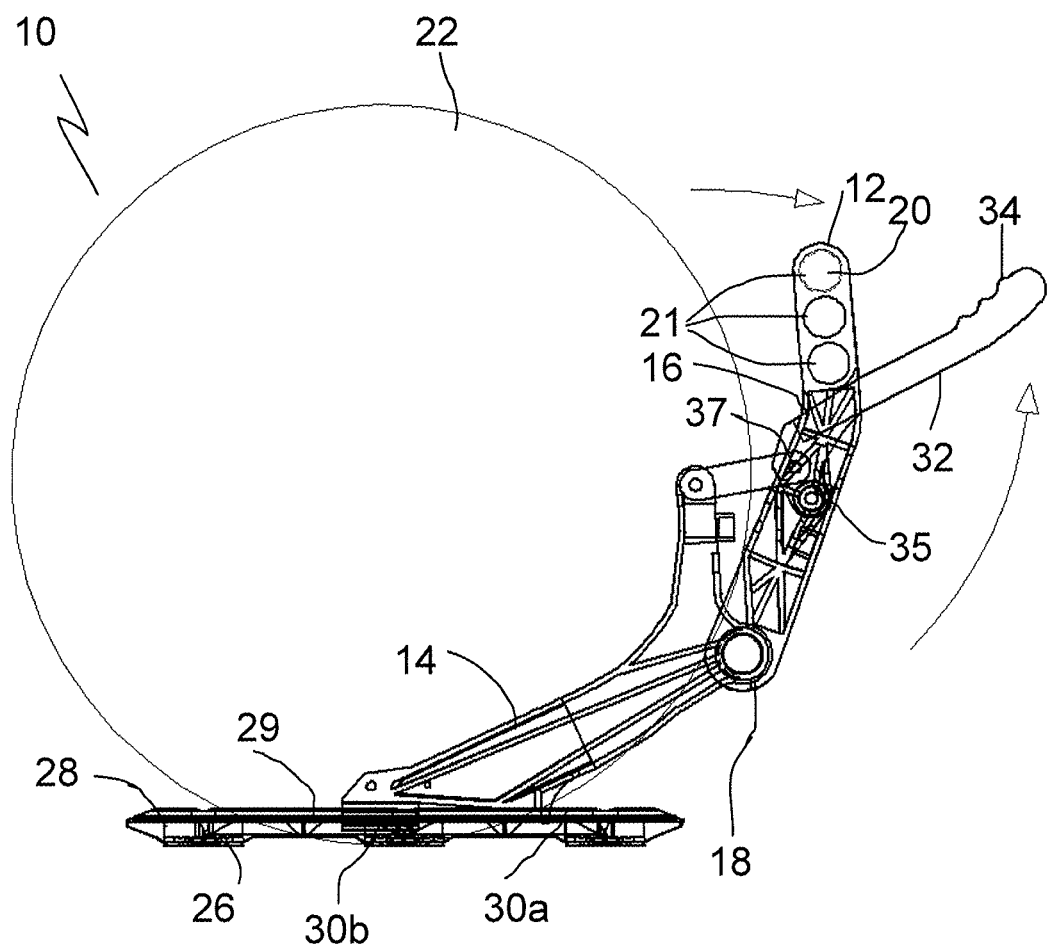
FIG. 6 is a side elevation view in partial section of the wheel restraint system with the upper portion in the release position.
Figure 7:
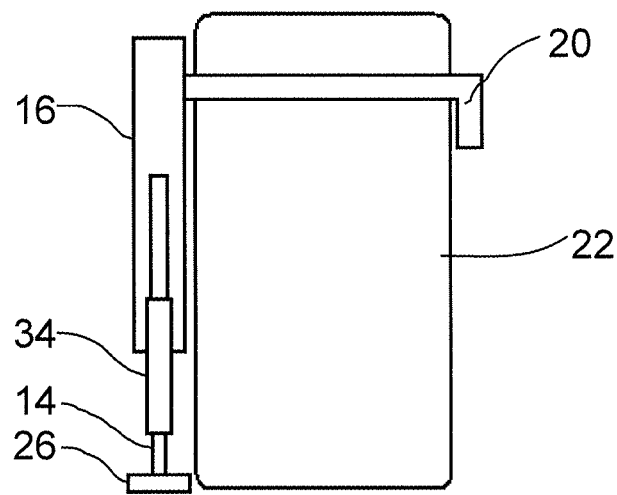
FIG. 7 is a rear elevation view of the wheel restraint system clamping a wheel.

Structure and Relationship of Parts:

Referring to FIG. 1, a wheel restraint system 10 includes a restraint body 12 which has a lower portion 14 and an upper portion 16. The upper portion 16 is connected to the lower portion 14 by a pivot point 18. The upper portion 16 has a clamping portion 20 which, as shown, is inserted into one of the holes 21 in upper portion 16. Clamping portion 20 may be moved depending on the size of the wheel to be restrained. Referring to FIG. 7, the clamping portion 20 extends the upper portion of an outer surface of the wheel 22 to be restrained. It will be understood that clamping portion 20 may take various forms, and need not extend across the entire width of the wheel 22. However, in a preferred embodiment and to increase the effectiveness of the restraint, the clamping portion 20 is bent to the shape of the wheel 22. Referring to FIGS. 5 and 6, the upper portion 16 moves about the pivot point 18 between a release position shown in FIG. 6 and a clamping position shown in FIG. 5 such that the clamping portion 20 moves toward and away from the outer surface of the wheel 22. Referring to FIG. 1, an anchor 26 is included for anchoring the lower portion 14 of the restraint body 12 to a surface. Referring to FIG. 3, the anchor 26 includes a rail 28 with an engagement profile 29 attached to the surface and, referring to FIG. 2, the lower portion 14 includes a rail engagement member 30. Referring to FIG. 1, the rail engagement member 30 selectively engages the engagement profile 29 along a length of the rail 28 such that the position of the lower portion 14 is adjustable.

Referring to FIG. 1, the clamping portion 20 is offset from the engagement member 30 along the length of the rail 28 such that the clamping force applied by the clamping portion 20 on the wheel 22 increases the engagement between the engagement member 30 and the engagement profile 29. Referring to FIG. 5, there are two engagement member 30a and 30b. When in the clamping position, the rear engagement member 30a is pressed downward and acts as a pivot to apply an upward force on the forward engagement member 30. Accordingly, the rear engagement member 30a preferably engages a profile on top of rail 28, while the forward engagement member 30b engages a profile on the bottom of rail 28.

Referring to FIG. 5, a lock 32 includes an actuator 34 for moving the upper portion 16 between the release position and the clamping position. The actuator 34 may be an over-center locking lever as shown such that it also provides the locking function as well, but may also be a ratchet lever, a crank lever, a screw mechanism, a spring loaded mechanism, an air mechanism, a hydraulic mechanism, or other type of actuator known in the art, including an actuator that has a separate lock, such as a pin or locking strap. As depicted, the actuator 34 moves about a pivot point 35 and is connected to the lower portion 14 by a component 37 that provides movement to the upper portion 16. Other types of actuators may connect the upper portion 16 and the lower portion 14 in an appropriate configuration to provide effective release and clamping motion.

Figure 8:
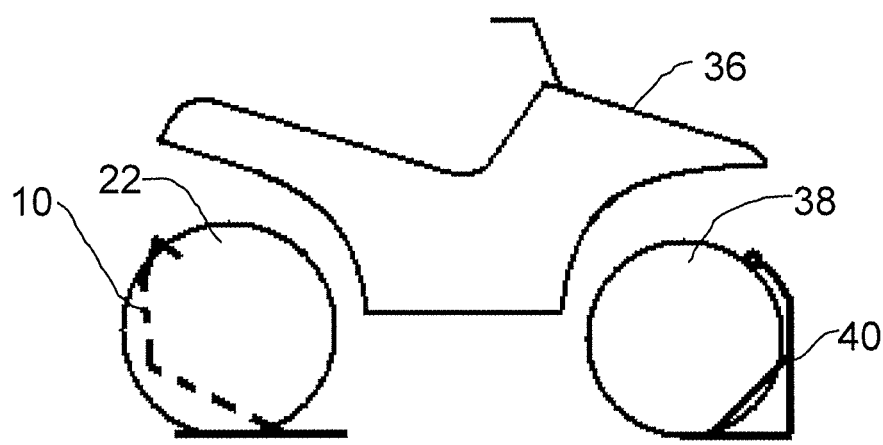
FIG. 8 is a side elevation view of the wheel restraint system securing the wheels of an ATV with a chock.
Figure 12:
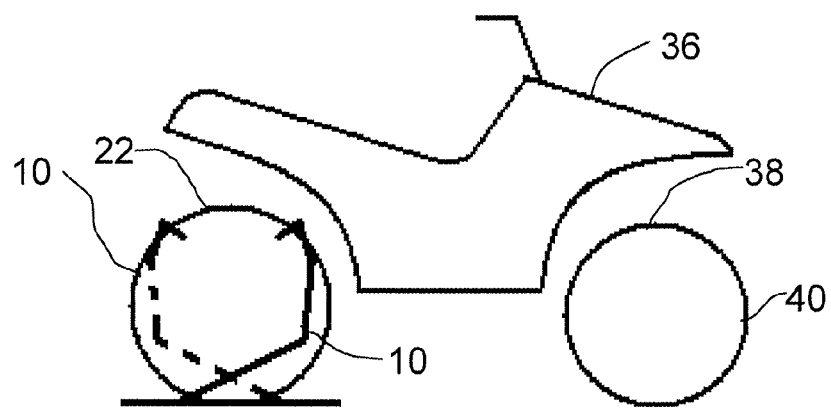
FIG. 12 is a side elevation view of the wheel restraining system securing a single wheel of an ATV.

Referring to FIG. 8, the clamping force of the wheel restraint system 10 must be opposed in an equal and opposite direction for the wheel restraint system 10 to be effective. If installed on a rear wheel, the wheel restraint system 10 may be incorporated with a front wheel chock 40 as shown, or a wall, such as the wall of a truck bed, which is known in the art. The ATV would be positioned such that at least one of the front wheels is positioned properly within a wheel chock 40. The anchor 26 of wheel restraint system 10 is placed such that at least one back wheel may be engaged by clamping portion 20 when actuator 34 on restraint body 12 is in the clamping position. Restraint body 12 should be adjusted such that the vehicle fits snugly between the wheel chocks 40 and the wheel restraint system 10. Alternatively, the restraint system 10 can be installed on the front tire with a rear wheel chock instead. FIG. 12 shows an additional embodiment, where two wheel restraint systems 10 are used to clamp each side of a wheel 22, which may be the front or rear wheel. The other wheel would not need to be restrained in this situation.

Operation:

Referring to FIG. 8, an ATV 36 is first positioned with one set of wheels 38, which may be front or rear wheels depending on how ATV 36 is positioned, placed against chocks 40 that will apply a back pressure toward the other set of wheels 22 that are to be restrained by wheel restraint system 10. As with restraints 10, chocks 40 preferably include a portion that engages the top of the wheel 38 to prevent the wheels from moving up and out during transportation. Referring to FIG. 5, the anchor 26 is anchored to a surface such that the rail engagement profile 29 faces upwards, preferably on the inside or between the wheels 22. Referring to FIG. 3, the wheels 22 are positioned parallel to and adjacent the rail 28 of anchor 26. Referring to FIG. 5, when the wheels 22 are properly positioned, restraint body 12 is installed on rail 28 such that it is within the periphery of the wheel 22, or in other words, such that the wheels 22 extends further back than the majority of the restraint body 12. This is also to reduce the footprint required by the system. This may be important if limited space is available on a trailer or the bed of a truck with a gate or tailgate that must be closed. Referring still to FIG. 5, the lower portion 14 of the restraint body 12 engages the rail engagement profile 29 with a rail engagement member 30. Engagement can occur along the entire length of the rail engagement profile 29 such that lower portion 14 of the restraint body 12 is adjustable along rail 28. Upper portion 16 of restraint body 12 is connected to lower portion 14 via a pivot point 18. An actuator 34 on upper portion 16 is movable between a raised and lowered position. The restraint body 12 is preferably installed on rail 28 in the release position shown in FIG. 6, where the actuator 34 provides the user with easy manueverability and provides the necessary space to move lower portion 14 along the rail engagement profile 29. The actuator 34 is then moved to the over-centred locking position shown FIG. 5, such that the upper portion 16 pivots about the pivot point 18 and causes the clamping portion 20 to engage and clamp the wheel 22. The actuator 34 acts as a lock 32 and places upper portion 16 in the clamping position. Referring to FIG. 7, in the clamping position, clamping portion 20 is no longer movable. Clamping portion 20 engages a wheel 22 on an upper portion of the outer surface. Preferably, clamping portion 20 engages the outer surface of the upper portion of the wheel 22 above its horizontal centreline, such as at the 2 o'clock position. This prevents the wheel 22 in the wheel restraint system 10 from moving up and out of the restraint 10.

Variations:

While the above description uses an ATV as an example, it will be understood that wheel restraint system 10 can be used for different wheeled vehicle, such as cars, trucks, golf carts, wheelchairs, etc.

Figure 9:
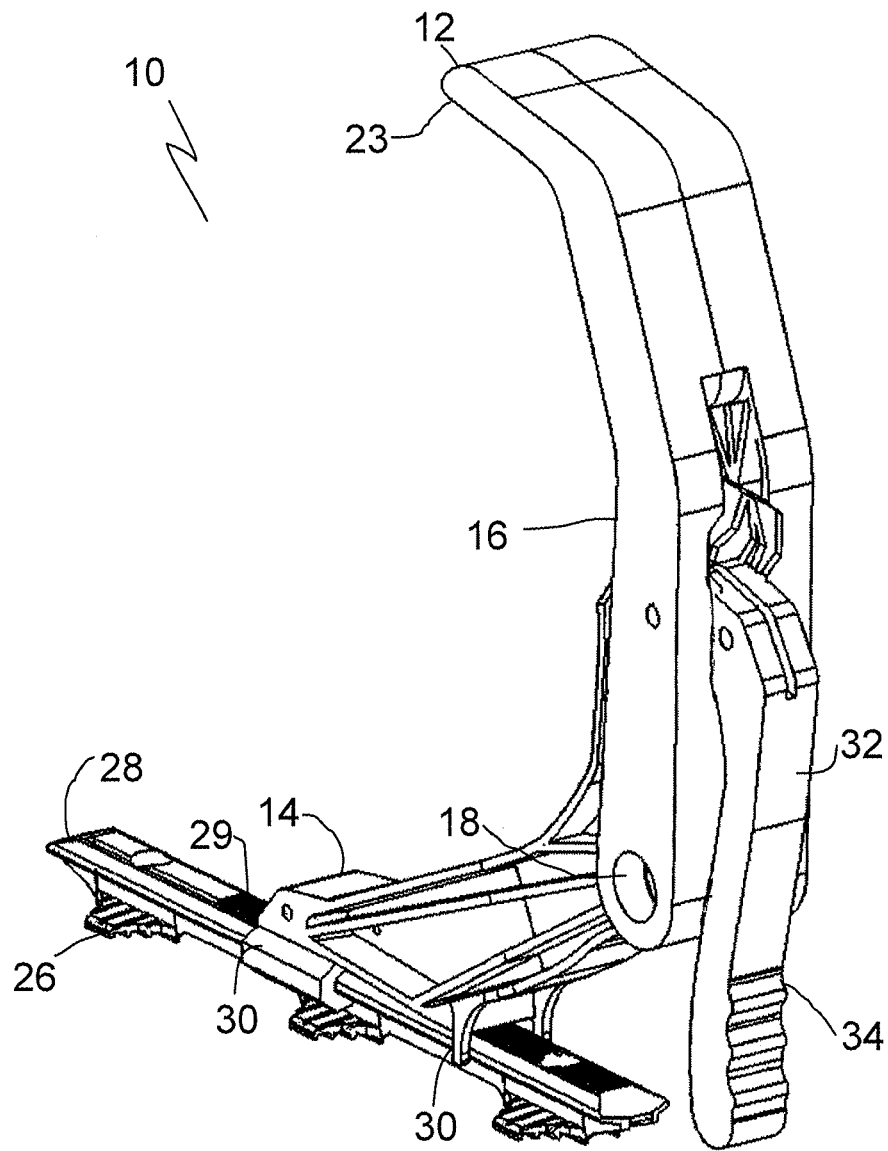
FIG. 9 is a rear perspective view of a variation of the wheel restraint system.
Figure 10:
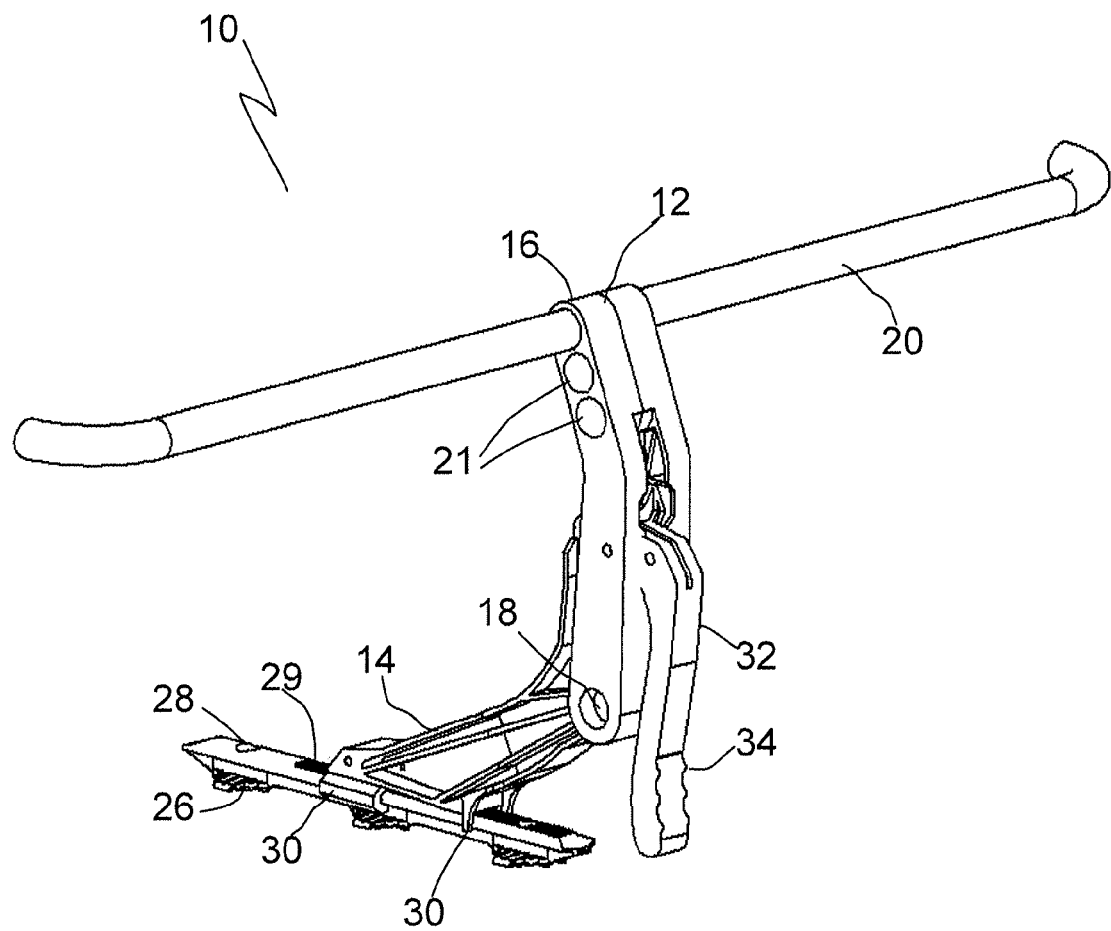
FIG. 10 is a rear perspective view of a further variation of the wheel restraint system.
Figure 11:
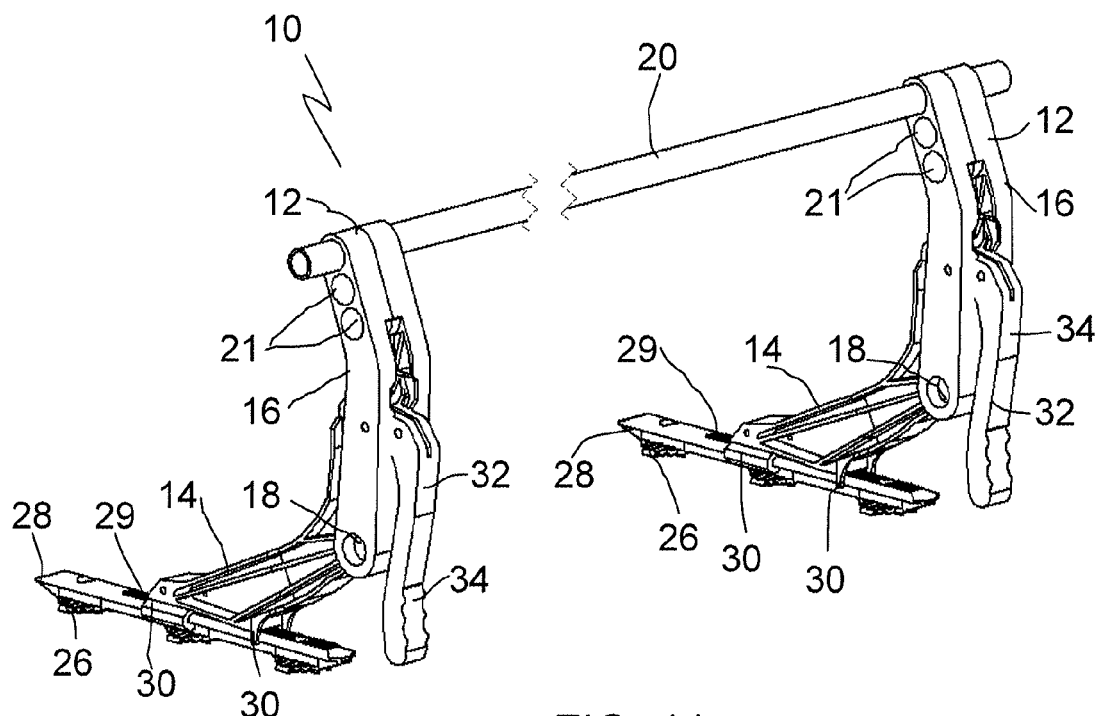
FIG. 11 is a rear perspective view of a further variation of the wheel restraint systems.

It will also be understood that various configurations may be used. For example, in FIG. 11, two restraint bodies 12 are placed such that each restraint body 12 is adjacent to and on the outer edge of a set of wheels on a vehicle. The clamping portion 20 extends between the two restraint bodies 12 and is used to clamp both wheels. Referring to FIG. 10, a restraint body 12 may be placed such that it lies somewhere in the middle of a set of wheels. The clamping portion 20 extends to either side of the restraint body 12 to effectively restrain each wheel of the set. Referring to FIG. 9, restraint body 12 may be designed to be placed inline with the wheel. In this embodiment, clamping portion 23 is an extension of upper portion 16, rather than a clamping bar 20 as depicted above. The clamping portion 23 extends from the top of the restraint body 12 over the wheel to effectively restrain the wheel. Preferably, restraint bodies 12 are positioned on the inside of the wheels to reduce the footprint required to transport the vehicle. Referring to FIG. 12, two wheel restraint systems 10 are mounted around a single wheel and provide equal and opposing clamping to effectively restrain the wheel.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A wheel restraint system comprising:
   a restraint body having a lower portion and an upper portion, the upper portion being connected to the lower portion by a pivot axis that is parallel to an axis of the wheel to be restrained;
   the upper portion having a clamping portion extending across at least a portion of an upper portion of an outer tread surface of the wheel to be restrained, the upper portion moving about the pivot axis between a release position and a clamping position such that the clamping portion moves toward and away from the outer tread surface of the wheel in a plane that is perpendicular to the outer tread surface;
   an actuator for moving the upper portion between the release position and the clamping position; and
   an anchor for anchoring the lower portion to a surface.

2. The wheel restraint system of claim 1, wherein the anchor comprises a rail attached to the surface, and the lower portion comprises a rail engagement member for selectively engaging the anchor along a length of the rail such that the position of the lower portion is adjustable.

3. The wheel restraint system of claim 2, wherein the rail engagement member comprises a rear engagement portion, and a forward engagement portion, such that when the upper portion is in the clamping position, the forward engagement portion is forced downward to engage an engagement profile on a bottom of the rail.

4. The wheel restraint system of claim 3, wherein the clamping portion is offset from the engagement member along the length of the rail, such that the clamping force applied by the clamping portion on the wheel increases the engagement between the engagement member and the engagement profile.

5. The wheel restraint system of claim 1, wherein the actuator comprises a lock for locking the upper portion in the clamping position.

6. The wheel restraint system of claim 1, wherein the actuator is one of an over-center locking lever, a ratchet lever, a crank lever, a screw mechanism, a spring loaded mechanism, an air mechanism, or a hydraulic mechanism.

7. The wheel restraint system of claim 1, wherein the restraint body is positioned adjacent to the wheel.

8. The wheel restraint system of claim 1,
   comprising more than one restraint bodies, the clamping portion extending between the restraint bodies.

9. The wheel restraint system of claim 8, wherein one or two wheels are received between the restraint bodies.

10. The wheel restraint system of claim 1, wherein the restraint body is positioned inline with the wheel.

\* \* \* \* \*